United States Patent
Li et al.

(10) Patent No.: US 11,289,913 B2
(45) Date of Patent: Mar. 29, 2022

(54) DYNAMIC STABILITY ANALYSIS AND CONTROL METHOD FOR VOLTAGE SOURCED CONVERTER BASED HIGH VOLTAGE DIRECT CURRENT TRANSMISSION SYSTEM

(71) Applicant: Sichuan University, Chengdu (CN)

(72) Inventors: Baohong Li, Chengdu (CN); Tianqi Liu, Chengdu (CN); Yan Tao, Chengdu (CN); Shunliang Wang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 212 days.

(21) Appl. No.: 16/790,747

(22) Filed: Feb. 14, 2020

(65) Prior Publication Data

US 2020/0266722 A1 Aug. 20, 2020

(30) Foreign Application Priority Data

Feb. 15, 2019 (CN) .......................... 201910118118.7

(51) Int. Cl.
*H02J 3/36* (2006.01)
*H02M 7/757* (2006.01)

(52) U.S. Cl.
CPC ............. *H02J 3/36* (2013.01); *H02M 7/7575* (2013.01); *H02J 2003/365* (2013.01)

(58) Field of Classification Search
CPC .... H02M 5/46; H02M 7/7575; H02M 1/0012; H02J 3/36; H02J 2003/365
See application file for complete search history.

(56) References Cited

U.S. PATENT DOCUMENTS

| 2012/0033461 A1* | 2/2012 | Papafotiou | H02J 3/36 363/35 |
| 2019/0157870 A1* | 5/2019 | Harnefors | H02M 7/53871 |

* cited by examiner

*Primary Examiner* — Alex Torres-Rivera
(74) *Attorney, Agent, or Firm* — Bayramoglu Law Offices LLC

(57) ABSTRACT

A dynamic stability analysis and control method for a voltage sourced converter based high voltage direct current (VSC-HVDC) transmission system. The method includes the following steps: unlocking a converter station of the VSC-HVDC transmission system to make the VSC-HVDC transmission system run in a non-island control mode; extracting corresponding parameters of the VSC-HVDC transmission system, wherein the parameters include an effective voltage value $U_{r0}$ of an AC system, an outgoing reactive power $Q_{vsc0}$ of the VSC-HVDC transmission system, a gain $k_p$ of a phase-locked loop (PLL), and a proportional integral time constant $k_i$ of the PLL; calculating a short-circuit ratio (SCR), an unit value of $U_{r0}$ and an unit value of $Q_{vsc0}$; calculating a key stable component; checking the sign of the key stable component to determine the stability of the VSC-HVDC transmission system.

2 Claims, 4 Drawing Sheets

DYNAMIC STABILITY ANALYSIS AND CONTROL METHOD FOR VOLTAGE SOURCED CONVERTER BASED HIGH VOLTAGE DIRECT CURRENT TRANSMISSION SYSTEM

CROSS REFERENCE TO THE RELATED APPLICATIONS

This application is based upon and claims priority to Chinese Patent Application No. 201910118118.7, filed on Feb. 15, 2019, the entire contents of which are incorporated herein by reference.

TECHNICAL FIELD

The present disclosure relates to the field of the voltage sourced converters based high voltage direct current transmission system control technology, and more particularly relates to a dynamic stability analysis and control method for a voltage source converter based high voltage direct current transmission system.

BACKGROUND

Compared with the line commutated converter based high voltage direct current (LCC-HVDC), the voltage sourced converter based high voltage direct current (VSC-HVDC) can provide reactive power support for the alternating current (AC) system without commutation failures. Therefore, the VSC-HVDC has a wider application prospect in weak systems. In particular, in island control mode (constant AC voltage control, constant AC frequency control), the VSC-HVDC can realize new functions that conventional transmission methods do not have, such as flexible transmission of renewable energy, passive system connection, and black start promotion.

Actually, the grid frequency is determined by the AC system grid when VSC is connected to an active power grid. In such situation, although the VSC has to operate in the non-island control mode, the VSC can still keep stable in a comparatively weak system because the reactive power can be supplied to the connected AC system. However, with the short circuit ratio (SCR) of the AC system decreasing, it is found that the stability of the VSC-HVDC in the non-island control mode is still restricted by the system strength. It means that the VSC suffers from the instability risk in an extremely weak AC system.

According to the reported results, the phase-locked loop (PLL) is considered to be the cause of VSC instability in an extremely weak system. To reveal the instable mechanism of VSC in weak system, some investigations have been done in recent years. Except for some special methods such as induction and graphic method, most studies are based on traditional state space model, impedance model and complex torque model. Classical state space model are generally based on eigenvalues and root loci, and reveals the stability mechanism of VSC through the classical control theory. As for the impedance method, which originates from the passivity theorem in nonlinear control, it determines system's stability according to the sign of the input admittance and impedance of the system.

In fact, the system strength is measured by SCR index, which is originated from the early direct current (DC) engineering design and construction. It was found that with the increase of DC capacity, the interaction between AC and DC would become more and more obvious and cause lots of stable problems. Intuitively, compared with the AC system, the DC seems "stronger", on the other side, the AC system becomes "weaker". In order to measure the interaction between AC system and DC system specifically and avoid the instability of the LCC-HVDC in the weak AC system, the working groups of Institute of Electrical and Electronic Engineers (IEEE) and Conseil International Des Grands Reseaux Elecctriques (CIGRE) defined the short-circuit ratio (SCR) and the effective short-circuit ratio (ESCR) to decide the strength of the AC system. SCR is defined as the ratio of the short-circuit capacity of the connected AC system to the rated power of the DC. Generally, when the SCR is greater than 3, the system is a strong system, and when the SCR is less than 2, the system is an extremely weak system. The larger the SCR is, the stronger strength the AC system would be.

Currently, analyzing the stability of VSC-HVDC through state space method and impedance method has the following disadvantages.

1) It is troublesome to establish the small signal model of the whole system when state space and root locus methods are used for stability analysis. (Bin Yuan, Tan Li, Jianzhong Xu, et al. Small-signal stability analysis of modular multi-level converter (MMC) system connected to weak AC grid. Proceedings of the Chinese Society for Electrical Engineering, 2017, 37 (18): 5339-5349).

2) As for the impedance method, the small signal model should also be established to obtain the equivalent admittance and impedance, which makes it neither impractical for real project analysis. Nevertheless, the impedance method can only obtain the external characteristic of the system, which also limits its application. (Wenhua Wu, Yandong Chen, An Luo, Leming Zhou, Xiaoping Zhou, Ling Yang, Xucheng Huang. DC impedance modeling, oscillation analysis and suppression method of island VSC-HVDC transmission system. Proceedings of the Chinese Society for Electrical Engineering, 2018, 38 (15): 4359-4368+4636. "A virtual resistance current limiting control method for suppressing continuous commutation failure of traditional DC transmission").

SUMMARY

The technical problem to be solved by the present disclosure is to provide a dynamic stability analysis and control method for a voltage sourced converter based high voltage direct current transmission system. The dynamic stability of the voltage source converter based high voltage direct current is judged by a key stable component, and the calculation of the key stable component is simple and clear. Once the operating state of the voltage source converter based high voltage direct current is determined, the component can be calculated. Compared with the traditional eigenvalue method and impedance method, the method of the present disclosure can determine whether or not the voltage source converter based high voltage direct current will be dynamically unstable without modeling the whole system.

In order to solve the above technical problem, the technical solution adopted by the present disclosure is as follows.

A method for determining the dynamic stability of a VSC-HVDC transmission system includes the following steps:

step 1: unlocking a converter station of the VSC-HVDC transmission system to make the VSC-HVDC transmission system run in a non-island control mode;

step 2: extracting related parameters of the VSC-HVDC transmission system, wherein the parameters include an effective voltage value $U_{r0}$ of an AC system, an outgoing reactive power $Q_{vsc0}$ of the VSC-HVDC transmission system, a gain $k_p$ of a phase-locked loop (PLL), and a proportional integral time constant $k_i$ of the PLL;

step 3: taking a rated capacity of the converter station and a voltage of the AC system as the reference values, and then calculating a SCR, an unit value of $U_{r0}$ and an unit value of $Q_{vsc0}$;

step 4: calculating a key stable component $$\left(SCR \times U_{r0} - \frac{Q_{VSC0}}{U_{r0}}\right) \frac{[(U_{r0}k_p^2 - k_i)\omega^2 + U_{r0}k_i^2]}{(k_i^2 + k_p^2\omega^2)},$$

where, $\omega$ is an angular frequency;

step 5: checking the sign of the key stable component $$\left(SCR \times U_{r0} - \frac{Q_{VSC0}}{U_{r0}}\right) \frac{[(U_{r0}k_p^2 - k_i)\omega^2 + U_{r0}k_i^2]}{(k_i^2 + k_p^2\omega^2)}$$

to determine the stability of the VSC-HVDC transmission system; wherein, if the key stable component is positive and greater than 0.5, the VSC-HVDC transmission system is stable, and at this time, the VSC-HVDC can be put into operation; if the key stable component is negative, the VSC-HVDC transmission system is unstable; if the key stable component is greater than or equal to 0 and less than or equal to 0.5, the VSC-HVDC transmission system is critically stable; when the VSC-HVDC transmission system is unstable or critically stable, the VSC-HVDC cannot be put into operation.

A method for controlling the dynamic stability of the VSC-HVDC transmission system, based on the determination results obtained by the above-mentioned method for determining the dynamic stability of the VSC-HVDC transmission system, is as follows.

If the VSC-HVDC transmission system is unstable, a control method for improving the stability of the system includes the following steps: firstly, calculating the right half part of the key stable component, that is, determining the sign of the formula $$\frac{[(U_{r0}k_p^2 - k_i)\omega^2 + U_{r0}k_i^2]}{(k_i^2 + k_p^2\omega^2)};$$

if the formula $$\frac{[(U_{r0}k_p^2 - k_i)\omega^2 + U_{r0}k_i^2]}{(k_i^2 + k_p^2\omega^2)}$$

is negative, then adjusting the gain $k_p$ of the PLL and the proportional integral time constant $k_i$ of the PLL to make the formula $$\frac{[(U_{r0}k_p^2 - k_i)\omega^2 + U_{r0}k_i^2]}{(k_i^2 + k_p^2\omega^2)}$$

become positive and greater than 0.5, thereby ensuring that the system is stable and the VSC-HVDC can be put into operation; if the formula $$\frac{[(U_{r0}k_p^2 - k_i)\omega^2 + U_{r0}k_i^2]}{(k_i^2 + k_p^2\omega^2)}$$

is positive, the key stable component is negative, which is caused by the left half part of the key stable component, that is, $$\left(SCR \times U_{r0} - \frac{Q_{VSC0}}{U_{r0}}\right)$$

is negative, then increasing the SCR of the system or adding a reactive power compensation equipment to reduce the $Q_{VSC0}$ to make $$\left(SCR \times U_{r0} - \frac{Q_{VSC0}}{U_{r0}}\right)$$

become positive and greater than 0.5, thereby ensuring that the system is stable and the VSC-HVDC can be put into operation.

Compared with the prior art, the advantages of the present disclosure are as follows. Compared with the mainstream impedance method and eigenvalue analysis method, the present disclosure only needs to simply calculate a value of the key stable component and determine the stability of the system by the sign of the value. The mainstream methods require detailed modeling and comprehensive analysis, which is troublesome. The method of the present disclosure is simple and easy to implement and is conducive to engineering practice.

DETAILED DESCRIPTION OF THE EMBODIMENTS

Figure 1:
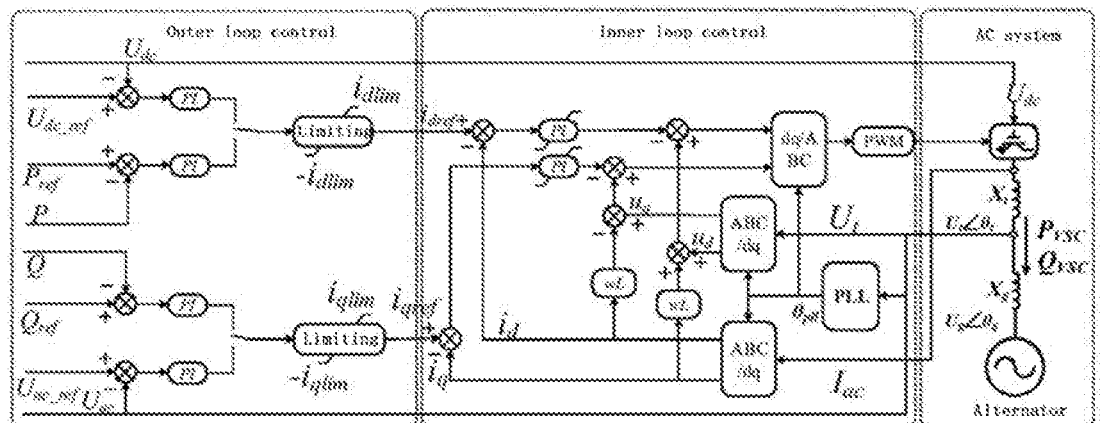
FIG. 1 is a vector control-based VSC control system connected to an AC system.
Figure 2:
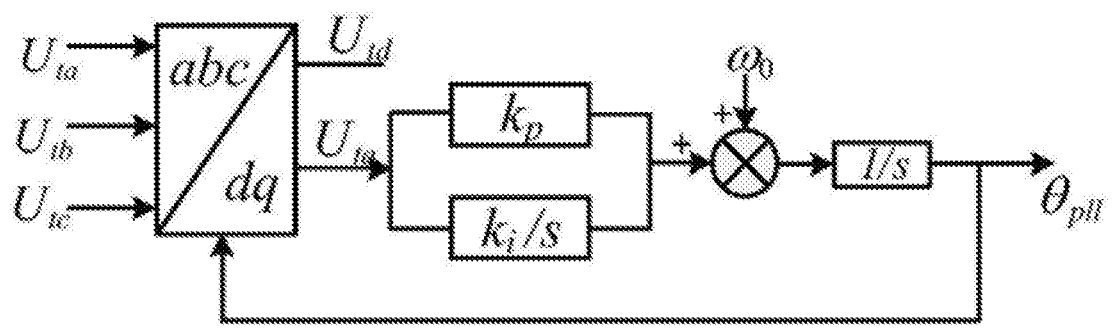
FIG. 2 is a control schematic of PLL.

The present disclosure is further described in detail below with reference to the drawings and the specific embodiments. A method for determining the dynamic stability of a VSC-HVDC transmission system in the present disclosure includes the following steps.

Step 1: The converter station of the VSC-HVDC transmission system is unlocked to make the VSC-HVDC transmission system run in a non-island control mode.

Step 2: The corresponding parameters of the VSC-HVDC transmission system are extracted, wherein the parameters include the effective voltage value $U_{t0}$ of the AC system, the outgoing reactive power $Q_{vsc0}$ of the VSC-HVDC, the gain $k_p$ of the PLL, and the proportional integral time constant $k_i$ of the PLL.

Step 3: The rated capacity of the converter station and the voltage of the AC system are taken as the reference values, and then the SCR, the unit value of $U_{t0}$ and the unit value of $Q_{vsc0}$ are calculated.

Step 4: The key stable component $$\left(SCR \times U_{t0} - \frac{Q_{VSC0}}{U_{t0}}\right) \frac{[(U_{t0}k_p^2 - k_i)\omega^2 + U_{t0}k_i^2]}{(k_i^2 + k_p^2\omega^2)}$$

is calculated, where, $\omega$ is the angular frequency.

Step 5: The sign of the key stable component $$\left(SCR \times U_{t0} - \frac{Q_{VSC0}}{U_{t0}}\right) \frac{[(U_{t0}k_p^2 - k_i)\omega^2 + U_{t0}k_i^2]}{(k_i^2 + k_p^2\omega^2)}$$

is checked to determine the stability of the VSC-HVDC transmission system. If the key stable component is positive and greater than 0.5, the VSC-HVDC transmission system is stable, and at this time, the VSC-HVDC can be put into operation. If the key stable component is negative, the VSC-HVDC transmission system is unstable. If the key stable component is greater than or equal to 0 and less than or equal to 0.5, the VSC-HVDC transmission system is critically stable. When the VSC-HVDC transmission system is unstable or critically stable, the VSC-HVDC cannot be put into operation.

Based on the determination results obtained by the above-mentioned method for determining the dynamic stability of the VSC-HVDC transmission system, if the VSC-HVDC transmission system is unstable, the control method for improving the stability of the system is as follow. Firstly, the right half part of the key stable component is calculated, that is, the sign of the formula $$\frac{[(U_{t0}k_p^2 - k_i)\omega^2 + U_{t0}k_i^2]}{(k_i^2 + k_p^2\omega^2)}$$

is determined. If the formula $$\frac{[(U_{t0}k_p^2 - k_i)\omega^2 + U_{t0}k_i^2]}{(k_i^2 + k_p^2\omega^2)}$$

is negative, then the gain $k_p$ of the PLL and the proportional integral time constant $k_i$ are adjusted to make the formula $$\frac{[(U_{t0}k_p^2 - k_i)\omega^2 + U_{t0}k_i^2]}{(k_i^2 + k_p^2\omega^2)}$$

become positive and greater than 0.5, thereby ensuring that the system is stable and the VSC-HVDC can be put into operation. If the formula $$\frac{[(U_{t0}k_p^2 - k_i)\omega^2 + U_{t0}k_i^2]}{(k_i^2 + k_p^2\omega^2)}$$

is positive, the key stable component is negative, which is caused by the left half part of the key stable component, that is, $$\left(SCR \times U_{t0} - \frac{Q_{VSC0}}{U_{t0}}\right)$$

is negative, then the SCR of the system is increased or the reactive power compensation equipment is added to reduce the $Q_{VSC0}$ to make $$\left(SCR \times U_{t0} - \frac{Q_{VSC0}}{U_{t0}}\right)$$

become positive and greater than 0.5, thereby ensuring that the system is stable and the VSC-HVDC can be put into operation.

Figure 3:
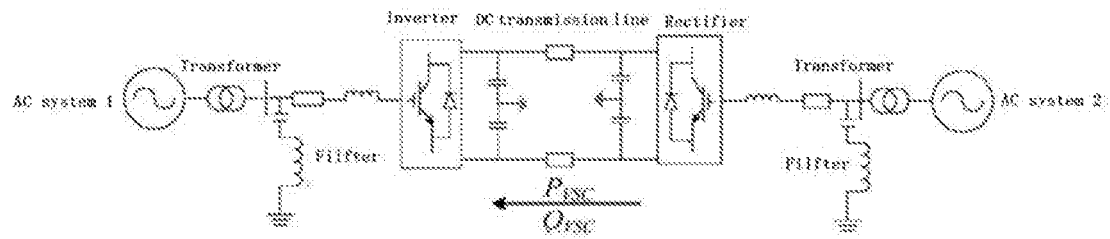
FIG. 3 shows a two-end VSC-HVDC transmission system.

The two-end VSC-HVDC transmission system in FIG. 3 is taken as an example for verification.

Solution 1: The parameters of the VSC-HVDC transmission system are set as follows (all values in the table are unit values):

| $k_i$ | $k_p$ | SCR | $Q_{VSC0}$ | $U_{t0}$ | calculated value of key stable component |
|---|---|---|---|---|---|
| 100 | 1 | 2.55 | 0.17 | 1.0 | −0.0264 |

Figure 4:
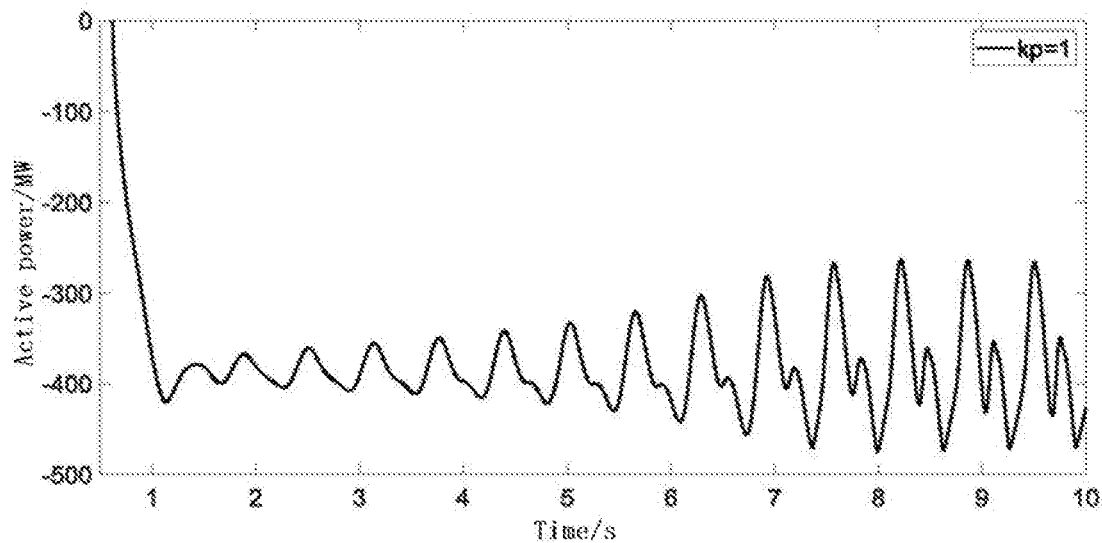
FIG. 4 shows the simulation verification result when the VSC-HVDC transmission system operates in the first kind of parameters.

The calculated value of the key stable component is −0.0264, determining that the system is unstable and the VSC-HVDC cannot be put into operation. According to the simulation verification shown in FIG. 4, the system oscillates and is divergent unstable, which is consistent with the theoretical analysis.

In order to improve the stability of the system, the different parts of the key stable component need to be calculated. Firstly, the value of the right half part of the key stable component is calculated as −0.011085, which is negative, indicating that the negative sign of the key stable component is caused by the right half part of the key stable component, then the control parameter $k_p$ of the PLL is gradually adjusted to make the key stable component become positive. When $k_p$ is increased to 1.5, the system parameters and the calculated value of the key stable component are as follows.

| $k_i$ | $k_p$ | SCR | $Q_{VSC0}$ | $U_{t0}$ | calculated value of key stable component |
|---|---|---|---|---|---|
| 100 | 1.5 | 2.55 | 0.17 | 1.0 | 0.0817 |

Figure 5:
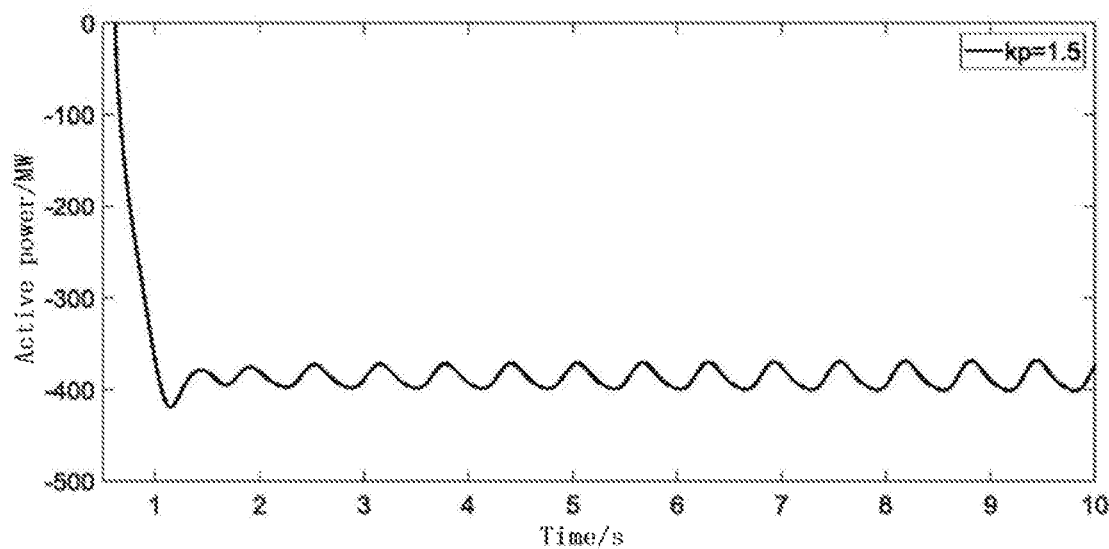
FIG. 5 shows the simulation verification result when the VSC-HVDC transmission system operates in the first kind of parameters after adjusting the control parameters of the PLL.

Now the calculated value of the key stable component is 0.0817, which is between 0 and 0.5, determining that the system is critically stable and the VSC-HVDC cannot be put into operation. According to the simulation verification shown in FIG. 5, the system undergoes a persistent oscillation and is indeed critically stable, which is consistent with the theoretical analysis.

Then the $k_p$ is increased to 10, and the system parameters and the key stable component value are as follows.

| $k_i$ | $k_p$ | SCR | $Q_{VSC0}$ | $U_{t0}$ | calculated value of key stable component |
|---|---|---|---|---|---|
| 100 | 10 | 2.55 | 0.17 | 1.0 | 1.1855 |

Figure 6:
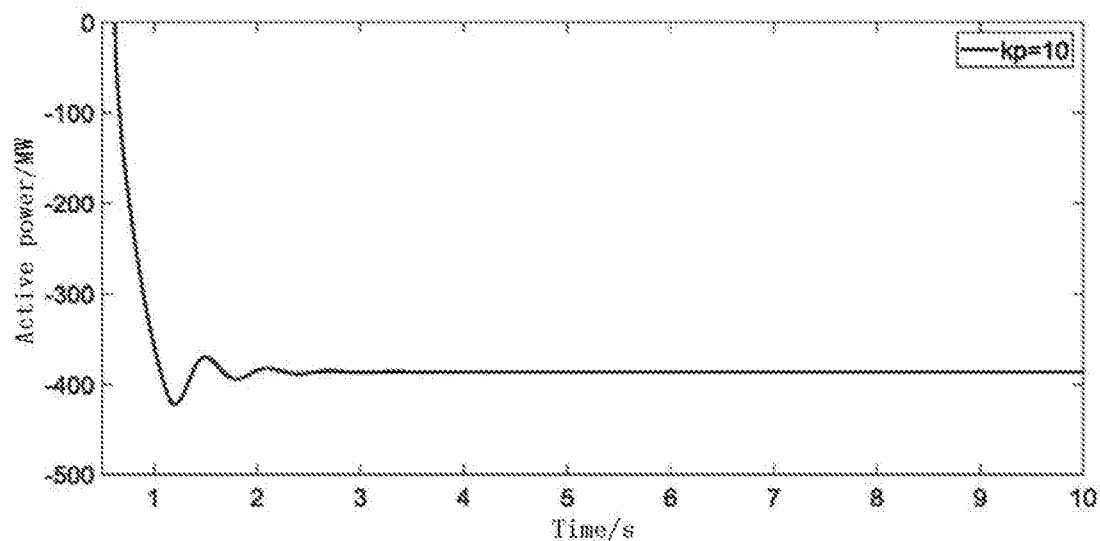
FIG. 6 shows the simulation verification result when the VSC-HVDC transmission system operates in the first kind of parameters after adjusting the control parameters of the PLL again.

The calculated value of the key stable component is 1.1855, which is positive, determining that the system is stable and the VSC-HVDC can be put into operation. According to the simulation verification shown in FIG. 6, the system converges, which is consistent with the theoretical analysis.

Solution 2: The parameters of the system are set as follows (all values in the table are unit values).

| $k_i$ | $k_p$ | SCR | $Q_{VSC0}$ | $U_{t0}$ | calculated value of key stable component |
|---|---|---|---|---|---|
| 21000 | 100 | 2.55 | 0.4 | 0.75 | 0.1845 |

Figure 7:
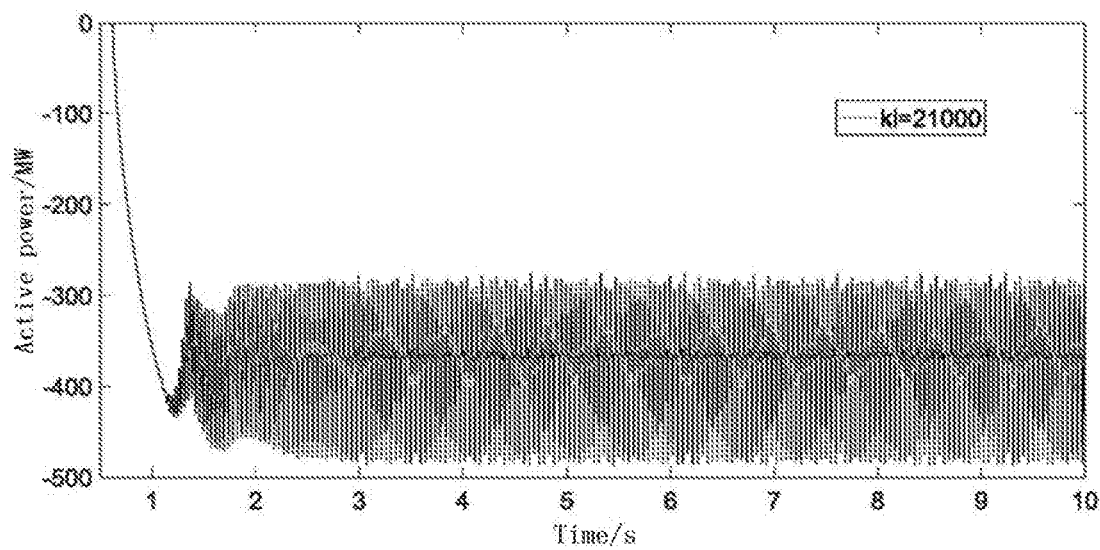
FIG. 7 shows the simulation verification result when the VSC-HVDC transmission system operates in the second kind of parameters.

The calculated value of the key stable component is 0.1845, which is between 0 and 0.5, determining that the system is critically stable and the VSC-HVDC cannot be put into operation. According to the simulation verification shown in FIG. 7, the system undergoes a persistent oscillation and is indeed critically stable, which is consistent with the theoretical analysis.

In order to improve the stability of the system, the control parameter $k_i$ of the PLL is gradually adjusted to ultimately expectantly make the key stable component be a large positive value. Firstly, $k_i$ is reduced to 20000, then the system parameters and the calculated value of the key stable component are as follows.

| $k_i$ | $k_p$ | SCR | $Q_{VSC0}$ | $U_{t0}$ | calculated value of key stable component |
|---|---|---|---|---|---|
| 20000 | 100 | 2.55 | 0.4 | 0.75 | 0.2019 |

Figure 8:
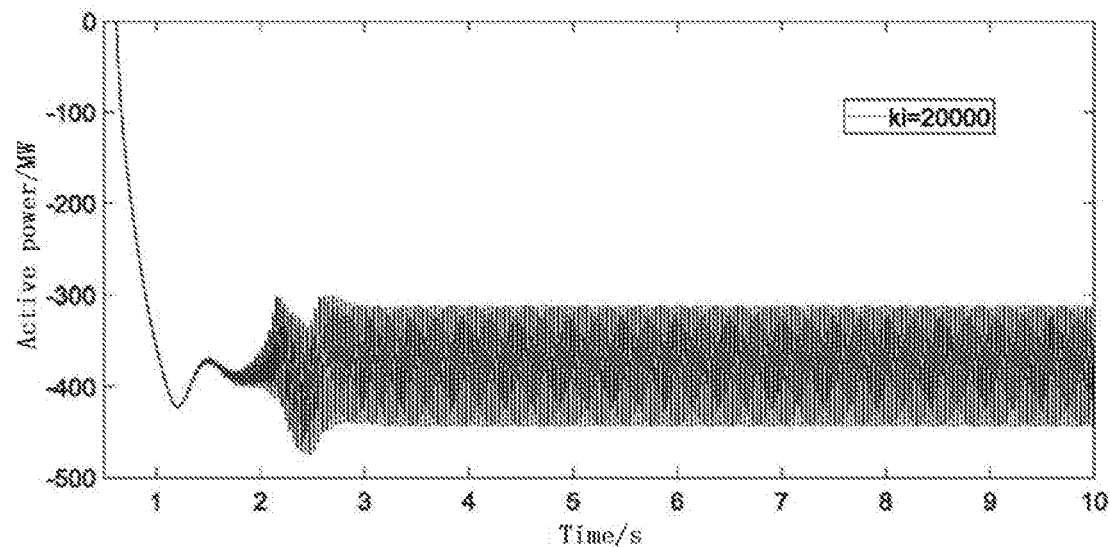
FIG. 8 shows the simulation verification result when the VSC-HVDC transmission system operates in the second kind of parameters after adjusting the control parameters of the PLL.

The calculated value of the key stable component is 0.2019, which is not much improved and is between 0 and 0.5, determining that the system is still critically stable and the VSC-HVDC cannot be put into operation. According to the simulation verification shown in FIG. 8, the system undergoes a persistent oscillation and is indeed critically stable, which is consistent with the theoretical analysis.

In order to further improve the stability of the system, the control parameter $k_i$ of the PLL is adjusted to 1, and meanwhile the reactive power equipment is added, so as to improve the stability of the voltage, making $U_{t0}=1$, and reducing $Q_{vsc0}$. The system parameters and the calculated value of the key stable component are as follows.

| $k_i$ | $k_p$ | SCR | $Q_{VSC0}$ | $U_{t0}$ | calculated value of key stable component |
|---|---|---|---|---|---|
| 1 | 100 | 2.55 | 0.17 | 1.0 | 2.3834 |

Figure 9:
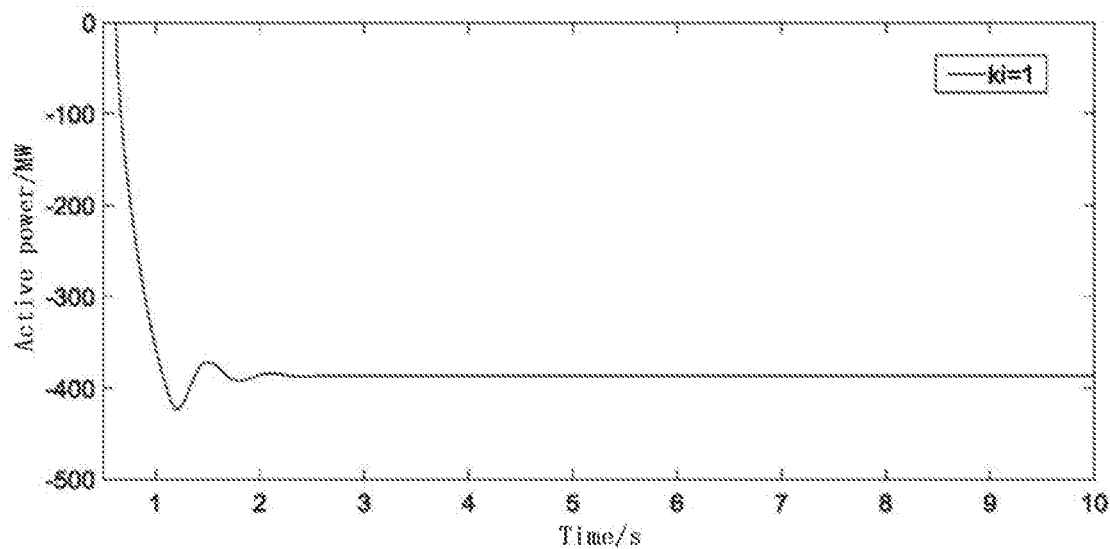
FIG. 9 shows the simulation verification result when the VSC-HVDC transmission system operates in the second kind of parameters after adjusting the control parameters of the PLL again.

The calculated value of the key stable component is 2.3834, which is positive, determining that the system is stable and the VSC-HVDC can be put into operation. According to the simulation verification shown in FIG. 9, the system converges, which is consistent with the theoretical analysis.

In sum, it is feasible to determine the dynamic stability of DC transmission by adopting the key stable component, and the method of improving the stability of the system is effective.

The invention claimed is:

1. A method for determining a dynamic stability of a Voltage Source Converter-High Voltage Direct Current (VSC-HVDC) transmission system, comprising the following steps:

step 1: unlocking a converter station of the VSC-HVDC transmission system to make the VSC-HVDC transmission system run in a non-island control mode;

step 2: extracting a plurality of parameters corresponding to the VSC-HVDC transmission system, wherein the plurality of parameters comprise an effective voltage value ($U_{t0}$) of an Alternating Current (AC system), an outgoing reactive power ($O_{vsc0}$) of the VSC-HVDC transmission system, a gain ($k_p$) of a phase-locked loop (PLL), and a proportional integral time constant ($k_i$) of the PLL;

step 3: taking a rated capacity of the converter station and a voltage of the AC system as reference values, and then calculating a short circuit ratio (SCR), an unit value of the $U_{t0}$ and an unit value of the $Q_{vsc0}$;

step 4: calculating a key stable component $$\left(SCR \times U_{t0} - \frac{Q_{VSC0}}{U_{t0}}\right) \frac{[(U_{t0}k_p^2 - k_i)\omega^2 + U_{t0}k_i^2]}{(k_i^2 + k_p^2\omega^2)},$$

wherein, $\omega$ is an angular frequency;

step 5: checking a sign of the key stable component $$\left(SCR \times U_{t0} - \frac{Q_{VSC0}}{U_{t0}}\right) \frac{[(U_{t0}k_p^2 - k_i)\omega^2 + U_{t0}k_i^2]}{(k_i^2 + k_p^2\omega^2)}$$

to determine the dynamic stability of the VSC-HVDC transmission system; wherein when the key stable component is positive and greater than 0.5, the VSC-HVDC transmission system is stable, and at this time, the VSC-HVDC is put into operation; when the key stable component is negative, the VSC-HVDC transmission system is unstable; when the key stable component is greater than or equal to 0 and less than or equal to 0.5, the VSC-HVDC transmission system is critically stable; when the VSC-HVDC transmission system is unstable or critically stable, the VSC-HVDC is not put into operation.

2. A method for controlling the dynamic stability of the VSC-HVDC transmission system according to a plurality of determination results obtained by the method of claim 1, comprising the following steps:

when the VSC-HVDC transmission system is unstable, firstly, calculating a right half part of the key stable component, to determine a sign of a formula $$\frac{[(U_{t0}k_p^2 - k_i)\omega^2 + U_{t0}k_i^2]}{(k_i^2 + k_p^2\omega^2)};$$

when the formula $$\frac{[(U_{t0}k_p^2 - k_i)\omega^2 + U_{t0}k_i^2]}{(k_i^2 + k_p^2\omega^2)}$$

is negative, adjusting the gain ($k_p$) of the PLL and the proportional integral time constant ($k_i$) of the PLL to make the formula $$\frac{[(U_{t0}k_p^2 - k_i)\omega^2 + U_{t0}k_i^2]}{(k_i^2 + k_p^2\omega^2)}$$

become positive and greater than 0.5, thereby ensuring that the VSC-HVDC transmission system is stable and the VSC-HVDC is put into operation; when the formula $$\frac{[(U_{t0}k_p^2 - k_i)\omega^2 + U_{t0}k_i^2]}{(k_i^2 + k_p^2\omega^2)}$$

is positive, the key stable component being negative is caused by a left half part of the key stable component, and a formula $$\left( SCR \times U_{t0} - \frac{Q_{VSC0}}{U_{t0}} \right)$$

is negative, increasing the SCR of the VSC-HVDC transmission system or adding a reactive power compensation equipment to reduce the $Q_{vsc0}$ to make the formula $$\left( SCR \times U_{t0} - \frac{Q_{VSC0}}{U_{t0}} \right)$$

become positive and greater than 0.5, thereby ensuring that the VSC-HVDC transmission system is stable and the VSC-HVDC is put into operation.

* * * * *